United States Patent Office 3,057,851
Patented Oct. 9, 1962

3,057,851
PROCESS FOR PREPARING VITAMIN $B_{12}$
Peter J. Van Melle, Homewood, Ill., assignor, by mesne assignments, to Armour-Pharmaceutical, a corporation of Delaware
No Drawing. Filed Apr. 13, 1959, Ser. No. 805,720
5 Claims. (Cl. 260—211.5)

This invention relates to the preparation of vitamin $B_{12}$ active substances and more particularly to a process for separating vitamin $B_{12}$ active substances from contaminants thereof.

This patent application is in part a continuation of patent application Serial No. 548,531, filed November 22, 1955, now abandoned.

The vitamin $B_{12}$ active substances have been prepared commercially from liver and from cultures of vitamin $B_{12}$-producing microorganisms. For example, there is available in the art a process for extracting vitamin $B_{12}$ active substances from a crude liver concentrate having a solids content in the range of 55–75%, which involves intimately contacting the crude liver concentrate with a solvent mixture containing 10–15% phenol and 85–90% ethylene dichloride at a temperature in the range of 90–150° F. to provide an organic solvent extract of such substances, separating undissolved materials from the extract, conditioning the separated extract with additional ethylene dichloride, intimately contacting the conditioned extract with an aqueous solution to provide an aqueous extract of such substances, and separating the organic solvents from the aqueous extract. On the other hand, the preparation of vitamin $B_{12}$ active substances from a microorganism culture may involve propagating in a suitable nutrient medium such vitamin $B_{12}$-producing microorganisms as *S. aureofaciens, S. griseus, M. smegmatis, P. lumichroma, A. alevaeca, B. megatherium, Alk. faecalis* and *S. fradiae*. The extracellular portion of the resulting microorganism culture can be separated from the cellular portion to provide an aqueous extract of vitamin $B_{12}$ active substances.

It has been found that the extracted vitamin $B_{12}$ active substances may be purified by a method which involves contacting an aqueous vitamin $B_{12}$-containing solution with Amberlite IRC-50 carboxylic ion exchange resin to fix vitamin $B_{12}$ on the resin, and then removing the fixed vitamin $B_{12}$ by passing over the resin an aqueous acidic mixture consisting of pyridine or acetone and a mineral acid in a concentration between about 0.05 and 0.1 N. This ion exchange fractionation is an improvement over previous purification procedures, but the method portends obstacles which render it difficult for adaptation to the commercial manufacture of vitamin $B_{12}$. One disadvantage is that the ratio of Amberlite IRC-50 ion exchange resin to vitamin $B_{12}$ required in achieving substantially quantitative fixation of the vitamin $B_{12}$ exceeds the practical limitations in equipment size available in conventional production facilities. Further, this unsatisfactory ratio of Amberlite IRC-50 to vitamin $B_{12}$ results in an ion exchange resin expense which is a major cost factor in the vitamin $B_{12}$ product. Another disadvantage is that several laborious and tedious steps are needed, in addition to the ion exchange fractionation, to convert a crude cobalamin extract into a vitamin $B_{12}$ product of pharmaceutical purity, i.e. suitable for medicinal purposes.

Accordingly, it is an object of this invention to provide an ion exchange fractionation process for separating vitamin $B_{12}$ active substances from contaminants which is adaptable to large scale manufacturing operations. Another object is to provide an ion exchange fractionation process for converting a crude extract of cobalamin into a vitamin $B_{12}$ product of pharmaceutical purity in a commercially feasible number of steps. A further object is to provide an ion exchange fractionation process for separating vitamin $B_{12}$ active substances from contaminants in which the ratio of resin to vitamin $B_{12}$ is well within the limitations in equipment size of production facilities. Still another object is to provide an ion exchange process for separating vitamin $B_{12}$ active substances from contaminants in which the vitamin $B_{12}$ can be substantially quantitatively adsorbed on an ion exchange resin and eluted therefrom in a yield which is reproducible from batch to batch. Other objects and advantages will become apparent as the specification proceeds.

In one aspect of this invention there is provided an ion exchange process for separating vitamin $B_{12}$ active substances from contaminants, which involves contacting a solution of vitamin $B_{12}$ active substances and contaminants with a special cation exchange resin to adsorb the vitamin $B_{12}$ active substances thereon, and then eluting the vitamin $B_{12}$ active substances from the cation exchange resin with an aqueous acidic water-miscible, oxygen-containing organic solvent. This special cation exchange resin can be characterized by containing carboxyl groups bonded to polymeric aromatic radicals and by having an average wet particle size of from 60 to 300 mesh. For example, an aqueous extract of milorganite can be contacted with this special cation exchange resin in a ratio of 28 parts of wet resin per 1000 parts of vitamin $B_{12}$ contained therein to adsorb vitamin $B_{12}$ on the resin, and the adsorbed vitamin $B_{12}$ can be eluted from the resin in substantially quantitative yield to obtain a vitamin $B_{12}$ product being about 500 times as pure as the vitamin $B_{12}$ starting material. Also, the purification obtained by this process in the preparation of vitamin $B_{12}$ from liver tissue is in the order of 150 to 200 fold.

The term "vitamin $B_{12}$ active substances" refers to vitamin $B_{12}$, which is a compound characterized chemically as a cobalt complex containing a CN group and biologically by being therapeutically active in the treatment of pernicious anemia, and closely related cobalt complexes, which may be designated as vitamin $B_{12}$ analogs, and which differ from vitamin $B_{12}$ in having some other characteristic group or anion in place of the CN group. This class of compounds (cobalamin) includes vitamin $B_{12}$ (cyanocobalamin); vitamin $B_{12a}$ and vitamin $B_{12b}$ (hydroxycobalamin), which are now recognized as being the same compound having a hydroxy group substituted for the CN group of vitamin $B_{12}$; vitamin $B_{12c}$, which is produced by treating vitamin $B_{12b}$ with nitrous acid; and vitamin $B_{12d}$, which is produced by removing the nitrite group from vitamin $B_{12c}$ by treatment with sulfamic acid. Concentrates of vitamin $B_{12}$ active substances derived from liver and from fermentation products may contain one or more of the vitamin $B_{12}$ analogs, in addition to vitamin $B_{12}$, and it is possible to convert these analogs to vitamin $B_{12}$ by chemical reaction. For example, hydroxycobalamin can be converted to cyanocobalamin by treatment with cyanide ion. Any of these vitamin $B_{12}$ active substances may be separated from contaminants by the process of this invention, but especially desirable ion exchange fractionation is achieved with cyanocobalamin.

The starting material for this adsorption-elution process may be a solution of vitamin $B_{12}$ active substances and contaminants derived from liver and fermentation products. This concentrate of vitamin $B_{12}$ active substances and contaminants can be an aqueous acidic solution, but preferably is an aqueous solution having a pH of not more than 6.0. Better adsorption of the vitamin $B_{12}$ active substances on the ion exchange resin may be obtained at a pH of from 3.0 to 5.0, and especially desirable results are achieved with an aqueous solution of vitamin $B_{12}$ active substances and contaminants having a pH of about 4.0 to 4.5.

The liver source for this concentrate of vitamin $B_{12}$ active substances may be any mammalian liver tissue, such as hog, beef and sheep livers, and the source of fermentation products may be any vitamin $B_{12}$-producing microorganism, such as the aforementioned species. Better results may be obtained wtih an aqueous concentrate of vitamin $B_{12}$ active substances and contaminants derived from mammalian liver. An especially suitable starting material is an aqueous extract of milorganite, which may be prepared according to the method set forth in Miner & Wolnak U.S. Patent No. 2,646,386. The milorganite product is a solid sludge resulting from the microbiological treatment of sewage.

Although the special ion exchange resin employed in this process may be any cation exchange resin containing carboxyl groups bonded to polymeric aromatic radicals and having an average wet particle size of from 60 to 300 mesh, better results can be obtained with a cation exchange resin of this character having an average wet particle size of from 80 to 200 mesh. Especially desirable purification of vitamin $B_{12}$ active substance can be achieved with a cation exchange resin of this character having an average wet particle size of from 100–150 mesh. By "average wet particle size" is meant an ion exchange resin in hydrated condition which has been subdivided so that a mean number of the resin particles are of the same size. The term "mesh" refers to the number of interstices per square inch in a screen or sieve maintained by the U.S. Bureau of Standards.

By comparison, Amberlite IRC–50 ion exchange resin has an average wet particle size of from about 20 to 40 mesh, and substantially all of the particles contained therein are larger than 50 mesh.

An ion exchange resin of this character may be prepared by suspending in water Amberlite XE–97, which is a carboxylic cation exchange resin manufactured by Rohm & Haas, and, after the resin has been impregnated with water, separating the residual liquid by decantation. The swelling of the resin with water can be accomplished in about 10 minutes, and the soaking operation can be repeated several times, if desired, to assure complete hydration. The hydrated resin can be screened in a stainless steel basket of the desired mesh size to obtain a cation exchange resin having an average wet particle size within the critical range.

This ion exchange fractionation process can be effectively carried out in either a batch or column operation, although its advantages can be more readily appreciated in a continuous commercial process in a column operation. This column operation may involve a vertically-positioned hollow cylinder into which is packed the special ion exchange resin. The solution of vitamin $B_{12}$ active substances and contaminants can be introduced at the top of the column and infused through the ion exchange bed. The effluent can be drawn off from the bottom of the column while the vitamin $B_{12}$ is adsorbed on the resin. The adsorbed vitamin $B_{12}$ active substances can be washed, if desired, and then eluted by introducing a suitable eluant at the top of the column to be infused through the ion exchange bed. The resulting eluate, containing the eluted vitamin $B_{12}$ active substances, can be drawn off from the bottom of the column and collected. The vitamin $B_{12}$ active substances can be recovered from the eluate by a procedure hereinafter described and, if desired, subjected to further purification.

In the preferred practice of the present invention a vitamin $B_{12}$ product of exceptional purity can be obtained by contacting a solution of vitamin $B_{12}$ active substances and contaminants with a cation exchange resin of the aforementioned character to adsorb the vitamin $B_{12}$ active substances on the resin, washing the resulting adsorbate with an aqueous acidic solution, then washing such adsorbate with a water-miscible, oxygen-containing organic solvent, thereafter washing such adsorbate with an aqueous acidic solution, and eluting the vitamin $B_{12}$ active substances from the washed adsorbate with an aqueous acidic water-miscible, oxygen-containing organic solvent. I have found that this sequence of washing steps results in the selective elution of contaminants adsorbed on the ion exchange resin so that the vitamin $B_{12}$ active substances can be subsequently eluted in a highly active state. Moreover, the purity of the vitamin $B_{12}$ obtained by this process is about 4 times that provided by previously available processes with an equivalent number of steps, while at the same time a comparatively minimal volume of eluate results.

This special sequence of steps is especially applicable to a process involving the special cation exchange resin described hereinbefore. On the other hand, with ion exchange resins having larger average particle sizes, such as IRC–50, there is a tendency for the adsorbed vitamin $B_{12}$ to defuse poorly through an ion exchange column and to become eluted from the ion exchange resin during the washing steps. Further, with such ion exchange resins having larger particle sizes the zone of adsorbed vitamin $B_{12}$ is not clearly marked and a much larger volume of eluant is required.

The aqueous acidic solution utilized in washing the vitamin $B_{12}$ adsorbate in accordance with the foregoing procedure should have a pH of less than 2.5. Better washing of the vitamin $B_{12}$ adsorbate can be achieved with an aqueous solution having a pH of from 1.0 to 2.0. The adjustment of this aqueous wash solution to a pH within the critical range can be accomplished with highly dissociable organic acids which do not oxidize the cobalamins in the ion exchange fractionation system, such as formic, trichloracetic, etc. The selective elution of vitamin $B_{12}$ contaminants in this process may be enhanced with an aqueous solution containing a non-oxidizing mineral acid in a concentration of at least 0.01 N. I mention such suitable mineral acids as sulfuric and sulfurous although hydrochloric acid is to be preferred. Still better results can be obtained with an aqueous solution containing a mineral acid in a concentration of from 0.05 to 0.15 N, an especially desirable selective elution of vitamin $B_{12}$ contaminants is achieved when the mineral acid content of the aqueous wash solution is about 0.1 N.

The water-miscible, oxygen-containing organic solvent employed in selectively eluting vitamin $B_{12}$ contaminants according to the aforementioned washing procedure may have less than 5 carbon atoms. For example, this organic solvent may be ethanol, methanol, propanol, isopropanol, butanol, tertiary butyl alcohol, etc. Better results can be obtained with an aqueous wash solution containing acetone at a concentration of at least 75% by volume. The elution of vitamin $B_{12}$ contaminants may be further enhanced when acetone is included in the aqueous solution at a concentration of from 80 to 95% by volume, and especially desirable elution is achieved at an acetone content of about 85%.

Although elution of vitamin $B_{12}$ active substances from the special ion exchange resin may be obtained with any of the hereinbefore mentioned water miscible oxygen-containing organic solvents at an acidic pH, I have found that substantially quantitative recovery of the vitamin $B_{12}$ active substances, in high purity, can be obtained with an acidic dioxane solution. The concentration of dioxane in this acidic eluant may be at least 20% by volume, although better results are obtained at a dioxane concentration of 50 to 70% by volume. Especially desirable elution of vitamin $B_{12}$ active substances can be obtained with an aqueous acidic solution containing dioxane in a concentration of about 60% by volume. This eluant solution should have a pH within the critical range hereinbefore specified in connection with the aqueous acidic solutions employed in selectively eluting vitamin $B_{12}$ contaminants from the ion exchange resin. However, better results may be obtained when the eluant contains a mineral acid, such as sulfuric, sulfurous, and hydrochloric acids, in a concentration of from 0.05 to 0.3 N, and especially desirable elution may be achieved with an aqueous solution containing sulfuric acid in a concentration of about 0.2 N.

The vitamin $B_{12}$ content of the various products employed in, or obtained by the method of this invention can be determined by the microbiological analytical procedure set forth in U.S. Pharmacopeia XV. However, since the adsorption and elution of vitamin $B_{12}$ active substances in this ion exchange fractionation method is substantially quantitative, I have found that such method can be efficiently adapted to the analysis of vitamin $B_{12}$. In the adaption of this ion exchange fractionation to an analytical procedure, it is desirable to convert the vitamin $B_{12}$ active substances to cyanocobalamin to facilitate spectrophotometric determinations. This conversion of the several cobalamins to cyanocobalamin can be accomplished by reacting the vitamin $B_{12}$ substances with cyanide ion. Alternatively, a solution of cobalamins can be combined with the cyanide ion and a nitrite ion, e.g. sodium nitrite, and the resulting solution heated to boiling at a pH of about 4.5 to obtain conversion thereof to cyanocobalamin. For example, a solution of vitamin $B_{12}$ active substances can be mixed with an alkali metal cyanide, such as potassium cyanide, and incubated at about pH 7.5 for a period of 3 hours or more to achieve conversion thereof to cyanocobalamin.

This invention can be further illustrated by the following specific examples:

Example I

Milorganite was extracted with water to obtain an aqueous extract containing vitamin $B_{12}$ active substances. This aqueous extract was purified by treatment with an ion exchange resin according to the following method:

An aqueous extract of milorganite, 100 ml., containing 300 mcg. of vitamin $B_{12}$ active substances and 4.5 gms. of total solids, was combined with 0.5 gm. of sodium nitrite and 0.4 gm. of potassium cyanide. The resulting solution was adjusted to pH 4.0 with hydrochloric acid and heated to boiling. The boiled solution was filtered through a Super-Cel filter surface, and the filter was then washed with water. The filtrate was obtained in a total volume of 130 ml., including the washings.

Amberlite XE-97, an ion exchange resin of the carboxyl type manufactured by Rohm and Haas, was classified to an average wet particle size of 100–150 mesh. The classified resin was utilized in the hydrogen form, and was not buffered during the ion exchange fractionation.

The classified resin, in the amount of 35 ml., was packed into a glass column having a diameter of 25 mm. and a height of 250 mm. The cyanide-treated aqueous extract of milorganite was infused gravitationally into the ion exchange bed at a rate of 3 ml. per minute. The effluent was discarded, and the resin bed was then washed with the following solutions in the specified sequence:

(1) 120 ml. of an aqueous 0.1 N hydrochloric acid solution.
(2) 75 ml. of an aqueous 85% acetone solution.
(3) 70 ml. of an aqueous 0.1 N hydrochloric acid solution.

After washing, the resin bed was eluted with an aqueous 60% dioxane solution containing 0.1 N of hydrochloric acid. In this elution, 8 ml. of colored eluate was collected. This portion of the eluate was found to contain 295 mcg. of cyanocobalamin and 9 mg. of total solids.

Example II

An aqueous extract of milorganite was treated with an ion exchange resin according to the following method:

The aqueous extract, 100 ml., contained 300 mcg. of vitamin $B_{12}$ active substances and 4.5 gms. of total solids. This extract was infused into 35 ml. of an ion exchange bed prepared by the method of Example I. The effluent was discarded, and the resin bed was washed with the following solutions in the specified sequence:

(1) 150 ml. of an aqueous 0.1 N sulfuric acid solution.
(2) 75 ml. of an aqueous 85% acetone solution.
(3) 75 ml. of an aqueous 0.1 N sulfuric acid solution.

The washed resin bed was eluted with an aqueous 60% dioxane solution containing 0.1 N of sulfuric acid. The colored eluate portion, in the amount of 9 ml., was collected and subjected to analysis. The results indicated that this eluate portion contained vitamin $B_{12}$ activity equivalent to 250 mcg. of cyanocobalamin and 8.5 mg. of total solids.

Example III

The following method was utilized in treating a feed supplement product manufactured by Pacific Yeast Products, Inc., which contained 254 mcg. of vitamin $B_{12}$ active substances per gm.

To 1 gm. of the feed supplement product was added 30 ml. of water, 150 mg. of sodium nitrite, and 150 mg. of potassium cyanide. The resulting mixture was adjusted to pH 4 with hydrochloric acid, and then heated to boiling. The boiled preparation was filtered through a Super-Cel filter surface, and the filter cake was washed with water.

Amberlite XE-97 ion exchange resin was classified to a wet particle size of 100–150 mesh. The classified resin, in the amount of 9 ml., was packed into a glass column having a diameter of 11 mm. and a height of 300 mm. The aforementioned filtrate and washings, totaling 50 ml., was infused into the packed resin bed at a rate of 2 ml. per minute. The effluent was discarded, and the resin bed was then washed with the following solutions in the specified sequence:

(1) 35 ml. of an aqueous 0.1 N hydrochloric acid solution.
(2) 25 ml. of an aqueous 85% acetone solution.
(3) 20 ml. of an aqueous 0.1 N hydrochloric acid solution.

The washed resin bed was eluted with an aqueous 60% dioxane solution containing 0.1 N of hydrochloric acid. The colored eluate portion, in the amount of 5 ml., was collected, and subjected to analysis. The results indicated that the eluate portion contained 250 mcg. of vitamin $B_{12}$ and 6 mg. of total solids.

It was ascertained from the solubility of this eluate portion in a mixture of cresol and carbon tetrachloride, upon acid washing, that the feed supplement product was substantially free from pseudo vitamin $B_{12}$.

Example IV

The following method was utilized in treating an aqueous extract of mammalian liver:

The aqueous liver extract, in the amount of 10 ml., contained 250 mcg. of vitamin $B_{12}$ active substances and 1.1 gm. of total solids. This aqueous solution was combined with 3 ml. of an aqueous 10% potassium cyanide solution, and adjusted to pH 7.5 with citric acid. After standing at room temperature for a period of 8 hours the solution was adjusted to pH 4 with citric acid, and the acidified solution infused into an Amberlite XE-97 ion exchange resin bed as described in Example III. The rate of infusion of this solution was 1.5 ml. per minute. The effluent was discarded, and the resin bed was then washed with the following solutions in the specified sequence:

(1) 10 ml. of pH 4 citric acid-sodium citrate buffer solution.
(2) 40 ml. of an aqueous 0.1 N hydrochloric acid solution.
(3) 35 ml. of an aqueous 85% acetone solution.
(4) 30 ml. of an aqueous 0.1 N hydrochloric acid solution.

The washed resin bed was eluted with an aqueous 60% dioxane solution containing 0.1 N of hydrochloric acid. The colored portion of the eluate, in the amount of 6 ml., was collected, and subjected to analysis. The results indicated that such eluate portion contained 246 mg. of cyanocobalamin and 5.5 mg. of total solids.

*Example V*

An aqueous extract of liver tissue, in the amount of 15 ml., containing 213 mcg. of cobalamin and 915 mg. of total solids, was treated by the following method:

This aqueous solution was combined with 200 mg. of potassium cyanide, and after standing at room temperature for a period of 3 hours, was adjusted to pH 4 with citric acid.

Amberlite XE-97 ion exchange resin was classified to a wet particle size of 100-150 mesh. The classified resin, in the amount of 8 ml., was adjusted to pH 4 with a citric acid-sodium citrate buffer solution, and packed into a glass column having a diameter of 11 mm. and a height of 300 mm. The cyanide-treated aqueous liver solution was infused into the ion exchange bed at a rate of 2 ml. per minute. The effluent was discarded, and the resin bed washed with the following solutions in the specified sequence:

(1) 35 ml. of an aqueous 0.1 N hydrochloric acid solution.
(2) 30 ml. of an aqueous 85% acetone solution.
(3) 25 ml. of an aqueous 0.1 N hydrochloric acid solution.

The washed resin bed was eluted with an aqueous 60% acetone solution containing 0.1 N of hydrochloric acid. The colored portion of the eluate, in the amount of 16 ml., was collected, and subjected to analysis. The results indicated that such eluate portion contained 200 mcg. of cyanocobalamin and 7 mg. of total solids.

*Example VI*

The following exemplifies the volume ratios employed in the ion exchange fractionation of vitamin $B_{12}$ active substances utilizing a cationic exchange resin having a wet particle size of about 100-150 mesh:

The ion exchange resin can be packed into a glass column having a diameter of 1.5 inches and a height of 24 inches. A column having these dimensions may contain about 2500 cc. of the ion exchange resin. An aqueous solution of vitamin $B_{12}$ active substances, in the amount of 3 l., containing about 7% of total solids and 2.6 mcg. of vitamin $B_{12}$ active substances per ml., can be infused into the resin bed at a rate of about 6 ml. per minute. The effluent can be discarded, and the resin bed washed with the following solutions in the specified sequence:

(1) 2 l. of a 0.1 N mineral acid solution.
(2) 1.5 l. of an aqueous 85% acetone solution.
(3) 1.5 l. of a 0.1 N mineral acid solution.

The washed resin can be eluted with an aqueous 60% dioxane solution containing 0.1 N of mineral acid. The eluate portion in the amount of 250 ml., can be collected for further purification or packaged for commercial use. To achieve an eluate portion of 250 ml. the total eluant employed may be about 500 ml.

By comparison, Amberlite IRC-50 ion exchange resin has an average wet particle size of from about 20 to 40 mesh, and substantially all of the particles contained therein are larger than 50 mesh.

While in the foregoing specification various embodiments of this invention have been set forth and specific details thereof elaborated for the purpose of illustration, it will be apparent to those skilled in the art that this invention is susceptible to other embodiments and that many of these details can be varied widely without departing from the basic concept and spirit of this invention.

I claim:
1. In a process for recovering vitamin $B_{12}$ active substances, the steps of contacting a solution of vitamin $B_{12}$ active substances and contaminants with a cation exchange resin to adsorb said vitamin $B_{12}$ active substances thereon and eluting the adsorbed vitamin $B_{12}$ active substances from said cation exchange resin with an aqueous acidic water-miscible organic solvent selected from the group consisting of alcohols and ketones containing less than 5 carbon atoms, said cation exchange resin being characterized by containing carboxyl groups bonded to polymeric aromatic radicals and by having an average wet particle size of from 60 to 300 mesh.

2. In a process for recovering vitamin $B_{12}$ active substances, the steps of contacting a solution of vitamin $B_{12}$ active substances and contaminants with a cation exchange resin to adsorb said vitamin $B_{12}$ active substances thereon, said cation exchange resin being characterized by containing carboxyl groups bonded to polymeric aromatic radicals and by having an average wet particle size of from 80 to 200 mesh, and eluting the vitamin $B_{12}$ active substances from said cation exchange resin with an acidic aqueous solution containing from 50 to 70% by volume of dioxane and a mineral acid in a concentration of from 0.05 to 0.15 N.

3. In a process for recovering vitamin $B_{12}$ active substances, the steps of contacting a solution of vitamin $B_{12}$ active substances and contaminants having a pH of from 3 to 5 with a cation exchange resin to adsorb said vitamin $B_{12}$ active substances thereon, said cation exchange resin being characterized by containing carboxyl groups bonded to polymeric aromatic radicals and by having an average wet particle size of from 100 to 150 mesh, washing the resulting adsorbate with an aqueous solution containing hydrochloric acid in a concentration of from 0.05 to 0.15 N, then washing said adsorbate with an aqueous solution containing acetone in a concentration of from 80 to 95% by volume, subsequently washing said adsorbate with an aqueous solution containing hydrochloric acid in a concentration of from 0.05 to 0.15 N, and thereafter eluting said vitamin $B_{12}$ active substances from the washed adsorbate with an acidic aqueous solution containing dioxane in a concentration of from 50 to 70% by volume and hydrochloric acid in a concentration of about 0.2 N.

4. The process of claim 3 in which said solution of vitamin $B_{12}$ active substances and contaminants is an extract of a solid sludge resulting from the microbiological treatment of sewage comprising a mass of microbial cells having disorganized cell walls.

5. The process of claim 3 in which said solution of vitamin $B_{12}$ active substances and contaminants is an aqueous extract of mammalian liver tissue.

References Cited in the file of this patent

UNITED STATES PATENTS

| 2,628,186 | Shive | Feb. 10, 1953 |
| 2,702,263 | Shafer et al. | Feb. 15, 1955 |
| 2,830,933 | Bouchard et al. | Apr. 15, 1958 |

FOREIGN PATENTS

| 1,032,256 | Germany | June 19, 1958 |